US012671090B2

(12) United States Patent
Matsuo

(10) Patent No.: US 12,671,090 B2
(45) Date of Patent: Jun. 30, 2026

(54) BINDER COMPOSITION FOR ALL-SOLID-STATE SECONDARY BATTERY, SLURRY COMPOSITION FOR ALL-SOLID-STATE SECONDARY BATTERY, SOLID ELECTROLYTE-CONTAINING LAYER, AND ALL-SOLID-STATE SECONDARY BATTERY

(71) Applicant: ZEON CORPORATION, Tokyo (JP)

(72) Inventor: Yusaku Matsuo, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 690 days.

(21) Appl. No.: 18/247,880

(22) PCT Filed: Oct. 6, 2021

(86) PCT No.: PCT/JP2021/037049
§ 371 (c)(1),
(2) Date: Apr. 5, 2023

(87) PCT Pub. No.: WO2022/085458
PCT Pub. Date: Apr. 28, 2022

(65) Prior Publication Data
US 2023/0378467 A1 Nov. 23, 2023

(30) Foreign Application Priority Data
Oct. 23, 2020 (JP) ................................. 2020-178429

(51) Int. Cl.
| *H01M 4/62* | (2006.01) |
| *C08F 220/18* | (2006.01) |
| *C08F 236/12* | (2006.01) |
| *H01M 10/0525* | (2010.01) |
| *H01M 10/0562* | (2010.01) |

(52) U.S. Cl.
CPC ....... *H01M 4/622* (2013.01); *C08F 220/1804* (2020.02); *C08F 236/12* (2013.01); *H01M 4/625* (2013.01); *H01M 10/0525* (2013.01); *H01M 10/0562* (2013.01); *C08F 2800/20* (2013.01); *H01M 2300/0068* (2013.01)

(58) Field of Classification Search
CPC .............................................. H01M 4/62–623
See application file for complete search history.

(56) References Cited

U.S. PATENT DOCUMENTS

| 7,262,244 B2 | 8/2007 | Guerin | |
| 2013/0040206 A1* | 2/2013 | Yoshida | H01M 10/0562 |
| | | | 427/58 |
| 2014/0272567 A1* | 9/2014 | Zhang | H01M 4/139 |
| | | | 252/503 |
| 2017/0288144 A1 | 10/2017 | Makino et al. | |
| 2017/0352915 A1* | 12/2017 | Katagiri | H01M 10/0525 |
| 2018/0198126 A1* | 7/2018 | Fukumine | C08K 3/04 |

FOREIGN PATENT DOCUMENTS

| JP | 4509792 B2 | 7/2010 |
| JP | 2012243476 A | 12/2012 |
| JP | 2013143299 A | 7/2013 |
| JP | 2016143614 A | 8/2016 |
| WO | 2012026583 A1 | 3/2012 |
| WO | 2016125716 A1 | 8/2016 |
| WO | 2019007875 A1 | 1/2019 |

OTHER PUBLICATIONS

Apr. 13, 2023, International Preliminary Report on Patentability issued in the International Patent Application No. PCT/JP2021/037049.
Feb. 14, 2025, the Extended European Search Report issued by the European Patent Office in the corresponding European Patent Application No. 21882599.0.

* cited by examiner

*Primary Examiner* — Hosung Chung
(74) *Attorney, Agent, or Firm* — KENJA IP LAW PC

(57) ABSTRACT

Provided is a binder composition with which it is possible to produce a slurry composition having excellent dispersibility and to form a solid electrolyte-containing layer that can cause an all-solid-state secondary battery to display excellent cycle characteristics. The binder composition contains a polymer and an aromatic halide. The polymer includes a nitrile group-containing monomer unit in a proportion of 10 mass % to 35 mass % and a (meth)acrylic acid ester monomer unit in a proportion of 15 mass % to 40 mass %. The aromatic halide has a structure in which not less than 2 and not more than 4 halogen atoms are bonded directly to an aromatic ring, and the content of the aromatic halide in the binder composition is 5 mass ppm to 3,000 mass ppm relative to the content of the polymer.

9 Claims, No Drawings

BINDER COMPOSITION FOR ALL-SOLID-STATE SECONDARY BATTERY, SLURRY COMPOSITION FOR ALL-SOLID-STATE SECONDARY BATTERY, SOLID ELECTROLYTE-CONTAINING LAYER, AND ALL-SOLID-STATE SECONDARY BATTERY

TECHNICAL FIELD

The present disclosure relates to a binder composition for an all-solid-state secondary battery, a slurry composition for an all-solid-state secondary battery, a solid electrolyte-containing layer, and an all-solid-state secondary battery.

BACKGROUND

Demand for secondary batteries such as lithium ion secondary batteries has been increasing in recent years for various applications such as mobile information terminals, mobile electronic devices, and other mobile terminals, and also domestic small power storage devices, motorcycles, electric vehicles, and hybrid electric vehicles. The widespread use of secondary batteries in such applications has been accompanied by demand for further improvement of secondary battery safety.

All-solid-state secondary batteries in which a solid electrolyte is used instead of an organic solvent electrolyte having high flammability and high risk of catching fire upon leakage are attracting interest as secondary batteries having high safety. A solid electrolyte may be contained inside an all-solid-state secondary battery as a solid electrolyte-containing layer (electrode mixed material layer or solid electrolyte layer) in which components such as the solid electrolyte are bound by a binder, for example.

Formation of a solid electrolyte-containing layer is performed using a slurry composition for a solid electrolyte-containing layer that is produced using a binder composition containing a polymer as a binder.

Improvements have been made to polymers used as binders and binder compositions containing such polymers with the aim of improving all-solid-state secondary battery performance (for example, refer to Patent Literature (PTL) 1 to 3).

CITATION LIST

Patent Literature

PTL 1: WO2016/125716A1
PTL 2: WO2012/026583A1
PTL 3: WO2019/007875A1

SUMMARY

Technical Problem

However, there is room for improvement of conventional binder compositions such as described above in terms of increasing dispersibility of a slurry composition and causing an all-solid-state secondary battery to display excellent cycle characteristics.

Accordingly, one object of the present disclosure is to provide a binder composition for an all-solid-state secondary battery with which it is possible to produce a slurry composition for an all-solid-state secondary battery having excellent dispersibility and to form a solid electrolyte-containing layer that can cause an all-solid-state secondary battery to display excellent cycle characteristics.

Another object of the present disclosure is to provide a slurry composition for an all-solid-state secondary battery that has excellent dispersibility and with which it is possible to form a solid electrolyte-containing layer that can cause an all-solid-state secondary battery to display excellent cycle characteristics.

Yet another object of the present disclosure is to provide a solid electrolyte-containing layer that can cause an all-solid-state secondary battery to display excellent cycle characteristics and an all-solid-state secondary battery that has excellent cycle characteristics.

Solution to Problem

The inventor conducted diligent investigation with the aim of solving the problem set forth above. The inventor reached a new finding that by using a binder composition that contains a specific polymer and a specific aromatic halide and in which the content of the aromatic halide relative to the content of the polymer is within a specific range, it is possible to sufficiently ensure dispersibility of a slurry composition while also causing an all-solid-state secondary battery to display excellent cycle characteristics. In this manner, the inventor completed the present disclosure.

Specifically, the present disclosure aims to advantageously solve the problem set forth above, and a presently disclosed binder composition for an all-solid-state secondary battery comprises a polymer and an aromatic halide, wherein the polymer includes a nitrile group-containing monomer unit in a proportion of not less than 10 mass % and not more than 35 mass % and a (meth)acrylic acid ester monomer unit in a proportion of not less than 15 mass % and not more than 40 mass %, the aromatic halide has a structure in which not less than 2 and not more than 4 halogen atoms are bonded directly to an aromatic ring, and content of the aromatic halide is not less than 5 mass ppm and not more than 3,000 mass ppm relative to content of the polymer. By using a binder composition that contains the polymer set forth above and an aromatic halide having the specific structure set forth above and in which a ratio of contents of the polymer and the aromatic halide is within the range set forth above, it is possible to obtain a slurry composition having excellent dispersibility and a solid electrolyte-containing layer that can cause an all-solid-state secondary battery to display excellent cycle characteristics.

Note that the content of an aromatic halide referred to in the present disclosure can be measured by gas chromatography.

Also note that in the present disclosure, "(meth)acryl" is used to indicate "acryl" and/or "methacryl".

The phrase "includes a monomer unit" as used in the present disclosure means that "a polymer obtained using the monomer includes a structural unit derived from the monomer". Moreover, the proportional content (mass %) of "structural units" (inclusive of "monomer units") in a polymer referred to in the present disclosure can be measured by a nuclear magnetic resonance (NMR) method such as $^1$H-NMR.

The presently disclosed binder composition for an all-solid-state secondary battery preferably further comprises a metal belonging to period 5 of the periodic table and belonging to groups 3 to 14 of the periodic table in an amount of not less than 0.5 mass ppm and not more than 200 mass ppm relative to the content of the polymer. When the binder composition contains a metal belonging to period 5 of the periodic table and belonging to groups 3 to 14 of the periodic table (hereinafter, also referred to simply as a "period 5 metal") in an amount that is within the range set forth above, cycle characteristics of an all-solid-state secondary battery can be further improved while also enhancing output characteristics of the all-solid-state secondary battery.

Note that the content of each type of metal contained in a binder composition referred to in the present disclosure can be measured by radio-frequency inductively coupled plasma atomic emission spectroscopy (ICP-AES). Specifically, the content can be measured by a method described in the EXAMPLES section.

Moreover, the presently disclosed binder composition for an all-solid-state secondary battery preferably further comprises a metal belonging to group 1 or group 2 of the periodic table in an amount of not less than 5 mass ppm and not more than 3,000 mass ppm relative to the content of the polymer. When the binder composition contains a metal belonging to group 1 or group 2 of the periodic table (hereinafter, also referred to simply as a "group 1 or 2 metal") in an amount that is within the range set forth above, water resistance of a solid electrolyte can be ensured while also further improving dispersibility of a slurry composition and enhancing cell characteristics of an all-solid-state secondary battery (i.e., lowering IV resistance of the all-solid-state secondary battery while also enhancing cycle characteristics and output characteristics of the all-solid-state secondary battery).

Furthermore, in the presently disclosed binder composition for an all-solid-state secondary battery, the polymer preferably has an iodine value of not less than 0.5 mg/100 mg and not more than 20 mg/100 mg. When the iodine value of the polymer is within the range set forth above, adhesiveness of a solid electrolyte-containing layer can be improved while also inhibiting oxidative degradation of an electrode active material (particularly a positive electrode active material) and even further enhancing cycle characteristics of an all-solid-state secondary battery.

Note that the "iodine value" of a polymer referred to in the present disclosure can be measured by a method described in the EXAMPLES section.

In the presently disclosed binder composition for an all-solid-state secondary battery, a number of carbon atoms forming an alkyl group that is bonded to a non-carbonyl oxygen atom in the (meth)acrylic acid ester monomer unit is preferably not less than 4 and not more than 9. When a structural unit that is derived from a (meth)acrylic acid ester monomer in which the number of carbon atoms forming an alkyl group bonded to a non-carbonyl oxygen atom is not less than 4 and not more than 9 is used as the (meth)acrylic acid ester monomer unit, dispersibility of a slurry composition and cycle characteristics of an all-solid-state secondary battery can be further improved.

Moreover, the presently disclosed binder composition for an all-solid-state secondary battery can further comprise a solvent.

Note that in the present disclosure, the above-described aromatic halide that has a structure in which not less than 2 and not more than 4 halogen atoms are bonded directly to an aromatic ring is considered to not be included among the "solvent".

Furthermore, the present disclosure aims to advantageously solve the problem set forth above, and a presently disclosed slurry composition for an all-solid-state secondary battery comprises: a solid electrolyte; and the binder composition for an all-solid-state secondary battery set forth above that contains a solvent. A slurry composition that contains a solid electrolyte, the polymer set forth above, the aromatic halide set forth above, and a solvent and in which the ratio of contents of the polymer and the aromatic halide is within the range set forth above has excellent dispersibility and can be used to form a solid electrolyte-containing layer that can cause an all-solid-state secondary battery to display excellent cycle characteristics.

The presently disclosed slurry composition for an all-solid-state secondary battery can further comprise an electrode active material. The slurry composition for an all-solid-state secondary battery containing the electrode active material can be used as a slurry composition for an electrode mixed material layer.

Moreover, the presently disclosed slurry composition for an all-solid-state secondary battery set forth above that contains an electrode active material preferably further comprises carbon nanotubes. By using a slurry composition for an electrode mixed material layer that contains carbon nanotubes (hereinafter, also referred to simply as "CNTs"), it is possible to further improve cell characteristics of an all-solid-state secondary battery.

Furthermore, the present disclosure aims to advantageously solve the problem set forth above, and a presently disclosed solid electrolyte-containing layer is formed using any one of the slurry compositions for an all-solid-state secondary battery set forth above. A solid electrolyte-containing layer that is formed using any one of the slurry compositions set forth above can cause an all-solid-state secondary battery to display excellent cycle characteristics.

Also, the present disclosure aims to advantageously solve the problem set forth above, and a presently disclosed all-solid-state secondary battery comprises the solid electrolyte-containing layer set forth above. An all-solid-state secondary battery that includes the solid electrolyte-containing layer set forth above has excellent cell characteristics such as cycle characteristics.

Advantageous Effect

According to the present disclosure, it is possible to provide a binder composition for an all-solid-state secondary battery with which it is possible to produce a slurry composition for an all-solid-state secondary battery having excellent dispersibility and to form a solid electrolyte-containing layer that can cause an all-solid-state secondary battery to display excellent cycle characteristics.

Moreover, according to the present disclosure, it is possible to provide a slurry composition for an all-solid-state secondary battery that has excellent dispersibility and with which it is possible to form a solid electrolyte-containing layer that can cause an all-solid-state secondary battery to display excellent cycle characteristics.

Furthermore, according to the present disclosure, it is possible to provide a solid electrolyte-containing layer that can cause an all-solid-state secondary battery to display excellent cycle characteristics and an all-solid-state secondary battery that has excellent cycle characteristics.

DETAILED DESCRIPTION

The following provides a detailed description of embodiments of the present disclosure.

The presently disclosed binder composition for an all-solid-state secondary battery is used to produce a slurry composition for an all-solid-state secondary battery. The presently disclosed slurry composition for an all-solid-state secondary battery is used in formation of a solid electrolyte-containing layer, such as an electrode mixed material layer or a solid electrolyte layer, that is used in an all-solid-state secondary battery, such as an all-solid-state lithium ion secondary battery. In other words, the presently disclosed slurry composition for an all-solid-state secondary battery can be used as a slurry composition for an electrode mixed material layer or a slurry composition for a solid electrolyte layer. Moreover, the presently disclosed solid electrolyte-containing layer is formed using the presently disclosed slurry composition for an all-solid-state secondary battery. Furthermore, the presently disclosed all-solid-state secondary battery includes the presently disclosed solid electrolyte-containing layer.

(Binder Composition for all-Solid-State Secondary Battery)

The presently disclosed binder composition contains a polymer and an aromatic halide in which not less than 2 and not more than 4 halogen atoms are bonded directly to an aromatic ring and can optionally further contain one or more selected from the group consisting of a period 5 metal, a group 1 or 2 metal, a solvent, and other components.

Features of the presently disclosed binder composition are that the polymer includes a nitrile group-containing monomer unit in a proportion of 10 mass % to 35 mass % and a (meth)acrylic acid ester monomer unit in a proportion of 15 mass % to 40 mass %, and that the content of the aromatic halide relative to the polymer is 5 mass ppm to 3,000 mass ppm.

As a result of the proportional contents of a nitrile group-containing monomer unit and a (meth)acrylic acid ester monomer unit in the polymer being within the ranges set forth above and the content of the aromatic halide relative to the polymer being within the range set forth above in the presently disclosed binder composition, it is possible to obtain a slurry composition having excellent dispersibility and a solid electrolyte-containing layer that can cause an all-solid-state secondary battery to display excellent cycle characteristics by using this binder composition.

<Polymer>

The polymer functions as a binder for binding components such as a solid electrolyte to one another in a solid electrolyte-containing layer that is formed from a slurry composition produced using the binder composition.

<<Chemical Composition>>

The polymer is required to include a nitrile group-containing monomer unit in a proportion of not less than 10 mass % and not more than 35 mass % and a (meth)acrylic acid ester monomer unit in a proportion of not less than 15 mass % and not more than 40 mass %. Note that the polymer may include structural units other than a nitrile group-containing monomer unit and a (meth)acrylic acid ester monomer unit (i.e., other structural units).

[Nitrile Group-Containing Monomer Unit]

Examples of nitrile group-containing monomers that can form a nitrile group-containing monomer unit include acrylonitrile; α-halogenoacrylonitriles such as α-chloroacrylonitrile and α-bromoacrylonitrile; and α-alkylacrylonitriles such as methacrylonitrile and α-ethylacrylonitrile. One of these nitrile group-containing monomers may be used individually, or two or more of these nitrile group-containing monomers may be used in combination. Of these nitrile group-containing monomers, acrylonitrile is preferable.

The proportion constituted by nitrile group-containing monomer units among all structural units included in the polymer when all structural units are taken to be 100 mass % is required to be not less than 10 mass % and not more than 35 mass % as previously described, is preferably 12 mass % or more, more preferably 15 mass % or more, and even more preferably 20 mass % or more, and is preferably 30 mass % or less, more preferably 28.5 mass % or less, and even more preferably 27 mass % or less. In a situation in which the proportion constituted by nitrile group-containing monomer units among all structural units of the polymer is less than 10 mass %, the polymer cannot sufficiently adsorb to a solid electrolyte and cannot cause good dispersion of the solid electrolyte in a slurry composition. This results in reduction of dispersibility of the slurry composition. On the other hand, in a situation in which the proportion constituted by nitrile group-containing monomer units among all structural units of the polymer is more than 35 mass %, solubility of the polymer in a solvent contained in a slurry composition decreases, and dispersibility of the slurry composition decreases. Moreover, when the proportion constituted by nitrile group-containing monomer units among all structural units in the polymer is not less than 10 mass % and not more than 35 mass %, it is possible to produce a slurry composition having excellent dispersibility while also improving cell characteristics (cycle characteristics, etc.) of an all-solid-state secondary battery.

[(Meth)Acrylic Acid Ester Monomer Unit]

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, nonyl acrylate, decyl acrylate, lauryl acrylate, n-tetradecyl acrylate, stearyl acrylate, 2-ethylhexyl acrylate, and cyclohexyl acrylate; acrylic acid alkoxy esters such as 2-methoxyethyl acrylate and 2-ethoxyethyl acrylate; 2-(perfluoroalkyl)ethyl acrylates such as 2-(perfluorobutyl) ethyl acrylate and 2-(perfluoropentyl)ethyl acrylate; methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, nonyl methacrylate, decyl methacrylate, lauryl methacrylate, tridecyl methacrylate, n-tetradecyl methacrylate, stearyl methacrylate, 2-ethylhexyl methacrylate, and cyclohexyl methacrylate; methacrylic acid alkoxy esters such as 2-methoxyethyl methacrylate and 2-ethoxyethyl methacrylate; and 2-(perfluoroalkyl)ethyl methacrylates such as 2-(perfluorobutyl)ethyl methacrylate and 2-(perfluoropentyl)ethyl methacrylate. One of these (meth)acrylic acid ester monomers may be used individually, or two or more of these (meth)acrylic acid ester monomers may be used in combination. The (meth)acrylic acid ester monomer is preferably a (meth)acrylic acid alkyl ester monomer in which the number of carbon atoms forming an alkyl group bonded to a non-carbonyl oxygen atom is not less than 4 and not more than 9 (hereinafter, also referred to simply as a "C4-C9 (meth)acrylic acid alkyl ester monomer"). By using a C4-C9 (meth)acrylic acid alkyl ester monomer, it is possible to disperse a solid electrolyte well in a slurry composition and to further improve dispersibility of the slurry composition. In addition, it is possible to impart appropriate flexibility to a solid electrolyte-containing layer and further improve cell characteristics of an all-solid-state secondary battery. The C4-C9 (meth)acrylic acid alkyl ester monomer is preferably n-butyl acrylate, 2-ethylhexyl acrylate, or cyclohexyl acrylate, for example.

The proportion constituted by (meth)acrylic acid ester monomer units among all structural units included in the polymer when all structural units are taken to be 100 mass % is required to be not less than 15 mass % and not more than 40 mass % as previously described, is preferably 20 mass % or more, more preferably 25 mass % or more, and even more preferably 30 mass % or more, and is preferably 37.5 mass % or less, and more preferably 35 mass % or less. In a situation in which the proportion constituted by (meth) acrylic acid ester monomer units among all structural units of the polymer is less than 15 mass %, adhesiveness of a solid electrolyte-containing layer decreases. On the other hand, in a situation in which the proportion constituted by (meth)acrylic acid ester monomer units among all structural units of the polymer is more than 40 mass %, flexibility of a solid electrolyte-containing layer cannot be sufficiently ensured. Moreover, when the proportion constituted by (meth)acrylic acid ester monomer units among all structural units of the polymer is not less than 15 mass % and not more than 40 mass %, it is possible to form a solid electrolyte-containing layer having excellent adhesiveness and flexibility and improve cell characteristics (cycle characteristics, etc.) of an all-solid-state secondary battery.

[Other Structural Units]

Although no specific limitations are placed on other structural units so long as they are structural units derived from monomers that are copolymerizable with a nitrile group-containing monomer and a (meth)acrylic acid ester monomer such as described above, a diene monomer unit is preferable from a viewpoint of ensuring dispersibility of a slurry composition and flexibility of a solid electrolyte-containing layer and improving cell characteristics of an all-solid-state secondary battery.

Examples of diene monomers that can form a diene monomer unit include aliphatic conjugated diene monomers such as 1,3-butadiene, isoprene, 2,3-dimethyl-1,3-butadiene, and 1,3-pentadiene. One of these diene monomers may be used individually, or two or more of these diene monomers may be used in combination.

Note that the term "diene monomer unit" as used in the present disclosure is inclusive of a structural unit (hydrogenated unit) obtained through further hydrogenation of a monomer unit included in a polymer that is obtained using a diene monomer.

Of the diene monomers described above, 1,3-butadiene and isoprene are preferable. In other words, a 1,3-butadiene unit, an isoprene unit, a hydrogenated 1,3-butadiene unit, or a hydrogenated isoprene unit is preferable as a diene monomer unit, and a hydrogenated 1,3-butadiene unit or a hydrogenated isoprene unit is more preferable as a diene monomer unit.

In a case in which the polymer includes a diene monomer unit, the proportion constituted by diene monomer units among all structural units included in the polymer when all structural units are taken to be 100 mass % is preferably 10 mass % or more, more preferably 20 mass % or more, even more preferably 30 mass % or more, and particularly preferably 40 mass % or more, and is preferably 75 mass % or less, more preferably 60 mass % or less, and even more preferably 50 mass % or less. When the proportion constituted by diene monomer units among all structural units is 10 mass % or more, dispersibility of a slurry composition (particularly a slurry composition for an electrode mixed material layer) can be further improved because the polymer can adsorb well to an electrode active material or a conductive material. On the other hand, when the proportion constituted by diene monomer units among all structural units is 75 mass % or less, adhesiveness of a solid electrolyte-containing layer can be sufficiently ensured. Accordingly, cell characteristics of an all-solid-state secondary battery can be further improved through the proportion constituted by diene monomer units among all structural units of the polymer being not less than 10 mass % and not more than 75 mass %.

<<Iodine Value>>

The iodine value of the polymer is preferably 0.5 mg/100 mg or more, more preferably 1.0 mg/100 mg or more, and even more preferably 2.0 mg/100 mg or more, and is preferably 20 mg/100 mg or less, more preferably 15 mg/100 mg or less, and even more preferably 10 mg/100 mg or less. Strength of the polymer is ensured and adhesiveness of a solid electrolyte-containing layer can be improved when the iodine value of the polymer is 0.5 mg/100 mg or more, whereas oxidative degradation of an electrode active material (particularly a positive electrode active material) can be inhibited when the iodine value of the polymer is 20 mg/100 mg or less. Accordingly, cycle characteristics of an all-solid-state secondary battery can be further improved through the iodine value of the polymer being not less than 0.5 mg/100 mg and not more than 20 mg/100 mg.

<<Weight-Average Molecular Weight (Mw)>>

The weight-average molecular weight of the polymer is preferably 10,000 or more, more preferably 50,000 or more, and even more preferably 100,000 or more, and is preferably 2,000,000 or less, more preferably 1,500,000 or less, and even more preferably 1,000,000 or less. When the weight-average molecular weight of the polymer is 10,000 or more, adhesiveness of a solid electrolyte-containing layer can be improved while also further improving cycle characteristics of an all-solid-state secondary battery. On the other hand, when the weight-average molecular weight of the polymer is 2,000,000 or less, dispersibility of a slurry composition can be further improved.

<<Molecular Weight Distribution (Mw/Mn)>>

The molecular weight distribution (ratio of weight-average molecular weight relative to number-average molecular weight) of the polymer is preferably 1.5 or more, more preferably 2.0 or more, and even more preferably 2.5 or more, and is preferably 5.5 or less, more preferably 5 or less, and even more preferably 4.5 or less. When the molecular weight distribution of the polymer is not less than 1.5 and not more than 5.5, dispersibility of a slurry composition can be further improved while also improving adhesiveness of a solid electrolyte-containing layer and even further enhancing cell characteristics of an all-solid-state secondary battery.

<<Production Method>>

No specific limitations are placed on the method by which the polymer is produced. For example, the polymer can be produced by polymerizing a monomer composition containing the monomers described above and then optionally performing hydrogenation.

Herein, the proportional content of each monomer in the monomer composition can be set in accordance with the proportional content of each monomer unit in the polymer.

Although the polymerization method is not specifically limited, a method such as solution polymerization, suspension polymerization, bulk polymerization, or emulsion polymerization may be used. A known emulsifier or polymerization initiator may be used in these polymerization methods as necessary. A non-ionic emulsifier such as polyoxyethylene lauryl ether may be used as an emulsifier, or an emulsifier that includes a group 1 or 2 metal such as sodium lauryl sulfate, sodium dodecylbenzenesulfonate, sodium dodecylbenzenesulfonate, sodium dodecyl diphenyl ether sulfonate, or sodium polyoxyethylene alkyl ether sulfate may be used.

The method of hydrogenation is not specifically limited and can be performed by a known hydrogenation method such as oil-layer hydrogenation or water-layer hydrogenation. The catalyst used in the hydrogenation may be any selective hydrogenation catalyst that is commonly known such as a palladium-based catalyst or a rhodium-based catalyst. Two or more of such catalysts may be used in combination.

Note that the hydrogenation may be performed by a method described in JP4509792B2, for example. Specifically, the hydrogenation of the polymer may be carried out after a metathesis reaction of the polymer is performed in the presence of a catalyst and a co-olefin.

The catalyst in the metathesis reaction may be a known ruthenium-based catalyst. Of such catalysts, Grubbs' catalysts such as bis(tricyclohexylphosphine)benzylidene ruthenium dichloride and 1,3-bis(2,4,6-trimethylphenyl)-2-(imidazolidinylidene)(dichlorophenylmethylene)(tricyclohexylphosphine)ruthenium are preferable as the catalyst in the metathesis reaction. The co-olefin may be an olefin having a carbon number of 2 to 16 such as ethylene, isobutane, or 1-hexane. Moreover, the hydrogenation catalyst that is used to perform hydrogenation after the metathesis reaction may be a known homogeneous hydrogenation catalyst such as Wilkinson's catalyst ((PPh$_3$)$_3$RhCl).

Note that in a case in which the resultant polymer is coagulated and then collected, a coagulant including a group 1 or 2 metal such as calcium chloride may be used.

<Aromatic Halide>

The presently disclosed binder composition contains an aromatic halide having a structure in which not less than 2 and not more than 4 halogen atoms are bonded directly to an aromatic ring. It is presumed that the high polarity of such an aromatic halide results in improved wettability of a solid electrolyte with a solvent in a slurry composition that is produced using the binder composition containing this aromatic halide. Consequently, dispersibility of the slurry composition can be increased. Moreover, an aromatic halide having the specific structure set forth above has a low tendency to undergo unexpected side reactions with a solid electrolyte. Accordingly, by using the binder composition containing this aromatic halide, it is possible to produce a slurry composition having excellent dispersibility while also producing an all-solid-state secondary battery having excellent cell characteristics such as cycle characteristics.

The aromatic halide may be an aromatic chloride, an aromatic fluoride, or an aromatic bromide, for example, without any specific limitations so long as it has a structure in which not less than 2 and not more than 4 halogen atoms are bonded directly to an aromatic ring. Of these aromatic halides, an aromatic chloride is preferable from a viewpoint of further improving dispersibility of a slurry composition and causing an all-solid-state secondary battery to display even better cell characteristics.

The aromatic chloride is preferably a compound in which not less than 2 and not more than 4 hydrogen atoms present on a ring of an aromatic hydrocarbon ring such as a benzene ring have been replaced by chlorine atoms. Examples of such compounds include dichlorobenzenes such as 1,2-dichlorobenzene, 1,3-dichlorobenzene, and 1,4-dichlorobenzene; trichlorobenzenes such as 1,2,3-trichlorobenzene, 1,2,4-trichlorobenzene, and 1,3,5-trichlorobenzene; and tetrachlorobenzenes such as 1,2,3,4-tetrachlorobenzene and 1,2,4,5-tetrachlorobenzene. Of these compounds, dichlorobenzenes are preferable from a viewpoint of even further improving dispersibility of a slurry composition and cell characteristics of an all-solid-state secondary battery and increasing adhesiveness of a solid electrolyte-containing layer, and 1,2-dichlorobenzene is more preferable.

Note that one aromatic halide may be used individually, or two or more aromatic halides may be used in combination.

The content of the aromatic halide in the binder composition relative to the content of the polymer described above is required to be not less than 5 mass ppm and not more than 3,000 mass ppm, is preferably 10 mass ppm or more, more preferably 15 mass ppm or more, and even more preferably 50 mass ppm or more, and is preferably 1,000 mass ppm or less, and more preferably 500 mass ppm or less. In a situation in which the content of the aromatic halide is less than 5 mass ppm relative to the polymer, dispersibility of a slurry composition decreases, and an all-solid-state secondary battery having excellent cell characteristics such as cycle characteristics cannot be obtained. On the other hand, in a situation in which the content of the aromatic halide is more than 3,000 mass ppm relative to the polymer, dispersibility of a slurry composition decreases because, particularly in a case in which the slurry composition contains an electrode active material (i.e., in a case in which the slurry composition is a slurry composition for an electrode mixed material layer), it becomes difficult to cause good dispersion of the electrode active material. In addition, loss of cell characteristics due to evolution of halogen gas inside an all-solid-state secondary battery may arise in a situation in which the content of the aromatic halide is more than 3,000 mass ppm relative to the polymer.

Accordingly, dispersibility of a slurry composition can be improved while also causing an all-solid-state secondary battery to display good cell characteristics such as cycle characteristics through the content of the aromatic halide in the binder composition being not less than 5 mass ppm and not more than 3,000 mass ppm relative to the content of the polymer.

No specific limitations are placed on the method by which the aromatic halide becomes contained in the binder composition. For example, a binder composition containing an aromatic halide can be produced by using a reaction solvent containing the aromatic halide to perform a polymerization reaction and/or hydrogenation reaction in production of the polymer or by adding the aromatic halide after production of the polymer.

<Metal Belonging to Period 5 of Periodic Table and Belonging to Groups 3 to 14 of Periodic Table>

The presently disclosed binder composition preferably contains a period 5 metal. The inclusion of a period 5 metal in the binder composition is presumed to improve cell characteristics of an all-solid-state secondary battery by reducing electronic resistance in the all-solid-state secondary battery.

The period 5 metal is preferably ruthenium (Ru), rhodium (Rh), or palladium (Pd) from a viewpoint of further improving cell characteristics of an all-solid-state secondary battery. One of these period 5 metals may be used individually, or two or more of these period 5 metals may be used in combination.

The content of the period 5 metal in the binder composition relative to the content of the polymer described above is preferably 0.5 mass ppm or more, more preferably 1 mass ppm or more, even more preferably 2 mass ppm or more, and particularly preferably 8 mass ppm or more, and is preferably 200 mass ppm or less, more preferably 150 mass ppm or less, and even more preferably 100 mass ppm or less. When the content of the period 5 metal is 1 mass ppm or more relative to the polymer, cell characteristics of an all-solid-state secondary battery can be further improved. On the other hand, when the content of the period 5 metal is 200 mass ppm or less relative to the polymer, cycle characteristics of an all-solid-state secondary battery can be sufficiently improved, and short circuiting between electrodes caused by deposition of the period 5 metal does not occur.

No specific limitations are placed on the method by which the period 5 metal becomes contained in the binder composition. For example, a binder composition containing a period 5 metal can be produced by using a catalyst including a period 5 metal such as the palladium-based catalyst, rhodium-based catalyst, ruthenium catalyst, or Wilkinson's catalyst described above in production of the polymer or by adding a substance that can supply a period 5 metal (for example, a palladium compound such as an organic complex or organic salt of palladium, a rhodium compound such as an organic complex or organic salt of rhodium, or a ruthenium compound such as an organic complex or organic salt of ruthenium) after production of the polymer.

<Metal Belonging to Group 1 or Group 2 of Periodic Table>

The presently disclosed binder composition preferably contains a group 1 or 2 metal. The inclusion of a group 1 or 2 metal in the binder composition can improve cell characteristics of an all-solid-state secondary battery. Although the reason for this is not certain, it is presumed that the group 1 or 2 metal adsorbs to and covers the surface of a solid electrolyte through electrostatic interactions or the like in a slurry composition and in a solid electrolyte-containing layer, thereby inhibiting the occurrence of a reaction between moisture and the solid electrolyte and inhibiting degradation of the solid electrolyte caused by this reaction.

The group 1 or 2 metal may be sodium (Na), potassium (K), lithium (Li), magnesium (Mg), or calcium (Ca), for example. One of these group 1 or 2 metals may be used individually, or two or more of these group 1 or 2 metals may be used in combination. Of these group 1 or 2 metals, sodium and calcium are preferable from a viewpoint of further improving cell characteristics of an all-solid-state secondary battery.

The content of the group 1 or 2 metal in the binder composition relative to the content of the polymer described above is preferably 5 mass ppm or more, more preferably 10 mass ppm or more, even more preferably 50 mass ppm or more, and particularly preferably 110 mass ppm or more, and is preferably 3,000 mass ppm or less, more preferably 2,000 mass ppm or less, and even more preferably 1,000 mass ppm or less. When the content of the group 1 or 2 metal is 5 mass ppm or more relative to the polymer, cell characteristics of an all-solid-state secondary battery can be further improved. On the other hand, when the content of the group 1 or 2 metal is 3,000 mass ppm or less relative to the polymer, there is no concern that the group 1 or 2 metal may cause aggregation of a solid electrolyte, polymer, or the like, and dispersibility of a slurry composition can be sufficiently ensured.

No specific limitations are placed on the method by which the group 1 or 2 metal becomes contained in the binder composition. For example, a binder composition containing a group 1 or 2 metal can be produced by using an emulsifier and/or coagulant including a group 1 or 2 metal such as previously described in production of the polymer or by adding a substance that can supply a group 1 or 2 metal (for example, a hydroxide including a group 1 or 2 metal) after production of the polymer. Moreover, the amount of a group 1 or 2 metal that is contained in the resultant binder composition can be reduced by passing the polymer through an ion exchange resin, for example.

<Solvent>

The presently disclosed binder composition optionally contains a solvent. The solvent is preferably an organic solvent having a carbon number of 6 or more. The inclusion of an organic solvent having a carbon number of 6 or more in the binder composition is presumed to enable further improvement of dispersibility of a slurry composition produced using the binder composition because aggregation of a polymer, solid electrolyte, or the like in the slurry composition is inhibited. Moreover, an organic solvent having a carbon number of 6 or more has a low tendency to react with a solid electrolyte and has excellent handleability due to the high boiling point thereof. Accordingly, the use of an organic solvent having a carbon number of 6 or more as the solvent enables uniform distribution of a solid electrolyte and the like in a solid electrolyte-containing layer and improvement of cell characteristics of an all-solid-state secondary battery.

<<Organic Solvent Having Carbon Number of 6 or More>>

The organic solvent having a carbon number of 6 or more may be xylene (carbon number: 8), butyl butyrate (carbon number: 8), n-butyl ether (carbon number: 8), diisobutyl ketone (carbon number: 9), hexyl butyrate (carbon number: 10), cyclopentyl methyl ether (carbon number: 6), hexane (carbon number: 6), cyclohexane (carbon number: 6), cyclohexanone (carbon number: 6), butyl acetate (carbon number: 6), 8-caprolactone (carbon number: 6), or isobutyl isobutyrate (carbon number: 8), for example. One of these organic solvents may be used individually, or two or more of these organic solvents may be used in combination. Of these organic solvents, xylene, butyl butyrate, diisobutyl ketone, cyclopentyl methyl ether, and isobutyl isobutyrate are more preferable from a viewpoint of further improving dispersibility of a slurry composition while also even further enhancing cell characteristics of an all-solid-state secondary battery.

<<Other Solvents>>

Note that the presently disclosed binder composition may contain solvents other than the organic solvent having a carbon number of 6 or more described above (i.e., other solvents). Examples of such other solvents include organic solvents having a carbon number of 5 or less such as cyclopentane and ethyl acetate. Note that one of these other solvents may be used individually, or two or more of these other solvents may be used in combination.

However, from a viewpoint of sufficiently enhancing dispersibility of a slurry composition and cell characteristics of an all-solid-state secondary battery, the proportion constituted by the organic solvent having a carbon number of 6 or more among the solvent when the overall solvent is taken to be 100 mass % is preferably 50 mass % or more, more preferably 70 mass % or more, even more preferably 90 mass % or more, particularly preferably 95 mass % or more, and most preferably 100 mass % (i.e., not substantially containing other solvents).

<Production Method of Binder Composition>

No specific limitations are placed on the method by which the presently disclosed binder composition is produced. For example, the binder composition can be produced by adding an aromatic halide, a substance that can supply a period 5 metal, a substance that can supply a group 1 or 2 metal, a solvent, and/or other components, as necessary, to a polymer obtained through polymerization and optional metathesis and hydrogenation as previously described. Note that examples of other components that can optionally be contained in the binder composition include the same components as "other components" subsequently described in the "Slurry composition for all-solid-state secondary battery" section.

(Slurry Composition for all-Solid-State Secondary Battery)

The presently disclosed slurry composition for an all-solid-state secondary battery contains at least a solid electrolyte and the presently disclosed binder composition for an all-solid-state secondary battery containing a solvent. More specifically, the presently disclosed slurry composition contains a solid electrolyte, the previously described polymer, the previously described aromatic halide, and the previously described solvent, and optionally contains an electrode active material and other components. The presently disclosed slurry composition has excellent dispersibility and can be used to form a solid electrolyte-containing layer that can improve cell characteristics such as cycle characteristics of an all-solid-state secondary battery as a result of the presently disclosed slurry composition containing the presently disclosed binder composition.

<Solid Electrolyte>

The solid electrolyte may be any particles formed of a solid that displays ion conductivity without any specific limitations, and is preferably an inorganic solid electrolyte.

Examples of inorganic solid electrolytes that can be used include crystalline inorganic ion conductors, amorphous inorganic ion conductors, and mixtures thereof without any specific limitations. In a case in which the all-solid-state secondary battery is an all-solid-state lithium ion secondary battery, for example, the inorganic solid electrolyte can normally be a crystalline inorganic lithium ion conductor, an amorphous inorganic lithium ion conductor, or a mixture thereof. In particular, the inorganic solid electrolyte preferably includes either or both of a sulfide inorganic solid electrolyte and an oxide inorganic solid electrolyte from a viewpoint of forming a solid electrolyte-containing layer having even better ion conductivity.

Although the following describes, as one example, a case in which the slurry composition for an all-solid-state secondary battery is a slurry composition for an all-solid-state lithium ion secondary battery, the presently disclosed slurry composition for an all-solid-state secondary battery is not limited to the following example.

The crystalline inorganic lithium ion conductor may be $Li_3N$, LISICON ($Li_{14}Zn(GeO_4)_4$), a perovskite-type crystalline inorganic lithium ion conductor (for example, $Li_{0.5}La_{0.5}TiO_3$), a garnet-type crystalline inorganic lithium ion conductor (for example, $Li_7La_3Zr_2O_{12}$), LiPON ($Li_{3+y}PO_{4-x}N_x$), Thio-LISICON ($Li_{3.25}Ge_{0.25}P_{0.75}S_4$), an argyrodite-type crystalline inorganic lithium ion conductor (for example, $Li_{5.6}PS_{4.4}Cl_{1.8}$), or the like.

One of the above-described crystalline inorganic lithium ion conductors may be used individually, or two or more of the above-described crystalline inorganic lithium ion conductors may be used as a mixture.

The amorphous inorganic lithium ion conductor may be a substance that includes a sulfur atom and displays ion conductivity, for example. More specific examples include glass Li—Si—S—O, Li—P—S, and an amorphous inorganic lithium ion conductor obtained using a raw material composition that contains $Li_2S$ and a sulfide of an element belonging to any of groups 13 to 15 of the periodic table.

The element belonging to any of groups 13 to 15 may be Al, Si, Ge, P, As, Sb, or the like, for example. Moreover, the sulfide of an element belonging to any of groups 13 to 15 may, more specifically, be $Al_2S_3$, $SiS_2$, $GeS_2$, $P_2S_3$, $P_2S_5$, $As_2S_3$, $Sb_2S_3$, or the like, for example. Furthermore, the method by which the amorphous inorganic lithium ion conductor is synthesized using the raw material composition may be an amorphization method such as mechanical milling or melt quenching, for example. The amorphous inorganic lithium ion conductor obtained using the raw material composition that contains $Li_2S$ and a sulfide of an element belonging to any of groups 13 to 15 of the periodic table is preferably $Li_2S$—$P_2S_5$, $Li_2S$—$SiS_2$, $Li_2S$—$GeS_2$, or $Li_2S$—$Al_2S_3$, and is more preferably $Li_2S$—$P_2S_5$.

One of the above-described amorphous inorganic lithium ion conductors may be used individually, or two or more of the above-described amorphous inorganic lithium ion conductors may be used as a mixture.

Of the examples described above, an amorphous sulfide containing Li and P or $Li_7La_3Zr_2O_{12}$ is preferable as an inorganic solid electrolyte for an all-solid-state lithium ion secondary battery from a viewpoint of forming a solid electrolyte-containing layer having even better ion conductivity. An amorphous sulfide containing Li and P and $Li_7La_3Zr_2O_{12}$ have high lithium ion conductivity, and thus the use thereof as an inorganic solid electrolyte can reduce IV resistance of an all-solid-state secondary battery and also improve output characteristics of the all-solid-state secondary battery.

Note that from a viewpoint of reducing IV resistance and improving output characteristics of a battery, the amorphous sulfide containing Li and P is more preferably sulfide glass formed of $Li_2S$ and $P_2S_5$, and particularly preferably sulfide glass produced from a mixed raw material of $Li_2S$ and $P_2S_5$ in which the molar ratio of $Li_2S$:$P_2S_5$ is 65:35 to 85:15. Moreover, the amorphous sulfide containing Li and P is preferably sulfide glass-ceramic obtained by reacting a mixed raw material of $Li_2S$ and $P_2S_5$ in which the molar ratio of $Li_2S$:$P_2S_5$ is 65:35 to 85:15 by a mechanochemical method. Note that from a viewpoint of maintaining lithium ion conductivity in a high state, the molar ratio of $Li_2S$:$P_2S_5$ in the mixed raw material is preferably 68:32 to 80:20.

The inorganic solid electrolyte may contain one or more sulfides selected from the group consisting of $Al_2S_3$, $B_2S_3$, and $SiS_2$ as a starting material other than $Li_2S$ and $P_2S_5$ to the extent that ion conductivity is not reduced. The addition of such a sulfide can stabilize a glass component in the inorganic solid electrolyte.

Likewise, the inorganic solid electrolyte may contain one or more ortho-oxoacid lithium salts selected from the group consisting of $Li_3PO_4$, $Li_4SiO_4$, $Li_4GeO_4$, $Li_3BO_3$, and $Li_3AlO_3$, in addition to $Li_2S$ and $P_2S_5$. The inclusion of such an ortho-oxoacid lithium salt can stabilize a glass component in the inorganic solid electrolyte.

One of the above-described solid electrolytes may be used individually, or two or more of the above-described solid electrolytes may be used as a mixture.

The number-average particle diameter of the above-described solid electrolyte is preferably 0.1 μm or more, more preferably 0.3 μm or more, and even more preferably 0.5 μm or more, and is preferably 10 μm or less, more preferably 7.5 μm or less, and even more preferably 5.0 μm or less. Dispersibility of the slurry composition can be further improved when the number-average particle diameter of the solid electrolyte is 0.1 μm or more, whereas IV resistance of an all-solid-state secondary battery can be reduced and cell characteristics of the all-solid-state secondary battery can be sufficiently enhanced when the number-average particle diameter of the solid electrolyte is 10 μm or less.

Note that the "number-average particle diameter" of the solid electrolyte referred to in the present disclosure can be measured by a method described in the EXAMPLES section.

<Binder Composition>

The presently disclosed binder composition containing at least the previously described polymer, the previously described aromatic halide, and the previously described solvent is used as a binder composition.

No specific limitations are placed on the mixing ratio of the solid electrolyte and the binder composition.

For example, the amount of the polymer originating from the binder composition that is contained in the slurry composition is preferably 0.1 parts by mass or more, more preferably 0.2 parts by mass or more, and even more preferably 0.3 parts by mass or more per 100 parts by mass of the solid electrolyte, and is preferably 20 parts by mass or less, more preferably 15 parts by mass or less, and even more preferably 10 parts by mass or less per 100 parts by mass of the solid electrolyte. When the content of the polymer in the slurry composition is 0.1 parts by mass or more per 100 parts by mass of the solid electrolyte, dispersibility of the slurry composition can be further improved while also sufficiently enhancing cell characteristics of an all-solid-state secondary battery. When the content of the polymer in the slurry composition is 20 parts by mass or less per 100 parts by mass of the solid electrolyte, ion conductivity of a solid electrolyte-containing layer can be sufficiently ensured, and cell characteristics of an all-solid-state secondary battery are not excessively lost.

<Electrode Active Material>

The electrode active material is a material that gives and receives electrons in an electrode of an all-solid-state secondary battery. In a case in which the all-solid-state secondary battery is an all-solid-state lithium ion secondary battery, for example, the electrode active material is normally a material that can occlude and release lithium.

Although the following describes, as one example, a case in which the slurry composition for an all-solid-state secondary battery is a slurry composition for an all-solid-state lithium ion secondary battery, the presently disclosed slurry composition for an all-solid-state secondary battery is not limited to the following example.

A positive electrode active material for an all-solid-state lithium ion secondary battery may be a positive electrode active material that is formed of an inorganic compound or a positive electrode active material that is formed of an organic compound without any specific limitations. Note that the positive electrode active material may be a mixture of an inorganic compound and an organic compound.

The positive electrode active material formed of an inorganic compound may be a transition metal oxide, a complex oxide of lithium and a transition metal (lithium-containing complex metal oxide), a transition metal sulfide, or the like, for example. The aforementioned transition metal may be Fe, Co, Ni, Mn, or the like. Specific examples of inorganic compounds that may be used in the positive electrode active material include lithium-containing complex metal oxides such as $LiCoO_2$ (lithium cobalt oxide), $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may have undergone partial element substitution.

One of the above-described positive electrode active materials formed of an inorganic compound may be used individually, or two or more of these materials may be used as a mixture.

The positive electrode active material formed of an organic compound may be a polyaniline, polypyrrole, polyacene, disulfide compound, polysulfide compound, N-fluoropyridinium salt, or the like, for example.

One of the above-described positive electrode active materials formed of an organic compound may be used individually, or two or more of these materials may be used as a mixture.

A negative electrode active material for an all-solid-state lithium ion secondary battery may be an allotrope of carbon such as graphite or coke. Note that a negative electrode active material formed of an allotrope of carbon can be used in a mixed or coated form with a metal, metal salt, oxide, or the like. Examples of negative electrode active materials that can be used also include oxides and sulfates of silicon, tin, zinc, manganese, iron, nickel, and the like; lithium metal; lithium alloys such as Li—Al, Li—Bi—Cd, and Li—Sn—Cd; lithium transition metal nitrides; and silicone.

One of the above-described negative electrode active materials may be used individually, or two or more of these materials may be used as a mixture.

Note that the particle diameter of the above-described electrode active material (positive electrode active material or negative electrode active material) is not specifically limited and can be the same as that of a conventionally used electrode active material. Also note that the amount of the above-described electrode active material in the slurry composition is not specifically limited and can be the same as that of a conventionally used electrode active material.

<Other Components>

Examples of other components that can optionally be contained in the slurry composition include, but are not specifically limited to, conductive materials, binders other than the previously described polymer, dispersants, leveling agents, defoamers, and reinforcing materials. These other components are not specifically limited so long as they do not influence battery reactions. One of these components may be used individually, or two or more of these components may be used in combination in a freely selected ratio.

From a viewpoint of further improving cell characteristics of an all-solid-state secondary battery, it is preferable that a slurry composition for an electrode mixed material layer contains a conductive material.

The conductive material ensures electrical contact among the electrode active material. Examples of conductive materials that can be used include conductive carbon materials such as carbon black (for example, acetylene black, Ketjenblack® (Ketjenblack is a registered trademark in Japan, other countries, or both), and furnace black), graphite, carbon fiber, carbon flake, and carbon nanofiber (for example, carbon nanotubes and vapor-grown carbon fiber); and fibers and foils of various metals. One of these conductive materials may be used individually, or two or more of these conductive materials may be used in combination. Of these conductive materials, carbon nanotubes are preferable from a viewpoint of further improving cell characteristics of an all-solid-state secondary battery.

Single-walled carbon nanotubes, multi-walled carbon nanotubes (inclusive of cup-stacked carbon nanotubes), or a mixture thereof can be used as the carbon nanotubes.

The specific surface area of the carbon nanotubes is preferably 100 m$^2$/g or more, and more preferably 200 m$^2$/g or more, and is preferably 1,000 m$^2$/g or less, and more preferably 500 m$^2$/g or less. By using CNTs having a specific surface area that is within any of the ranges set forth above, cell characteristics of an all-solid-state secondary battery can be further improved (in particular, IV resistance can be reduced).

Note that the "specific surface area" of the CNTs is the nitrogen adsorption specific surface area measured by the BET (Brunauer-Emmett-Teller) method.

The carbon nanotubes preferably have an average diameter of not less than 0.5 nm and not more than 200 nm from a viewpoint of further improving cell characteristics of an all-solid-state secondary battery.

Moreover, the carbon nanotubes preferably have an average length of not less than 1 μm and not more than 1,000 μm from a viewpoint of further improving cell characteristics of an all-solid-state secondary battery.

Note that the "average diameter" and the "average length" of the carbon nanotubes can be determined as arithmetic mean values of measurement values obtained by observing the CNTs using a transmission electron microscope (TEM) and measuring the diameters (external diameters) and lengths of 50 CNTs from an obtained TEM image.

The proportional content of the conductive material in the slurry composition for an all-solid-state secondary battery is preferably 0.1 parts by mass or more, and more preferably 0.5 parts by mass or more per 100 parts by mass of the electrode active material, and is preferably 10 parts by mass or less, and more preferably 7 parts by mass or less per 100 parts by mass of the electrode active material. When the amount of the conductive material is within any of the ranges set forth above, electrical contact among the electrode active material can be sufficiently ensured, and cell characteristics of an all-solid-state secondary battery can be further improved.

<Production of Slurry Composition>

The slurry composition for an all-solid-state secondary battery set forth above can be obtained by mixing the above-described components by any mixing method, for example, without any specific limitations. Note that in a case in which a slurry composition for an electrode mixed material layer containing an electrode active material and a conductive material is to be produced, the conductive material may be premixed with the previously described polymer to produce a conductive material dispersion liquid, and then the conductive material dispersion liquid that is obtained may be mixed with the electrode active material.

(Solid Electrolyte-Containing Layer)

The presently disclosed solid electrolyte-containing layer is a layer that contains a solid electrolyte and may, for example, be an electrode mixed material layer (positive electrode mixed material layer or negative electrode mixed material layer) that gives and receives electrons via electrochemical reactions, a solid electrolyte layer that is disposed between a positive electrode mixed material layer and a negative electrode mixed material layer that are in opposition to each other, or the like.

Moreover, the presently disclosed solid electrolyte-containing layer is formed using the slurry composition for an all-solid-state secondary battery set forth above. For example, the presently disclosed solid electrolyte-containing layer can be formed by applying the slurry composition set forth above onto the surface of a suitable substrate to form a coating film and subsequently drying the coating film that is formed. In other words, the presently disclosed solid electrolyte-containing layer is formed of a dried product of the slurry composition set forth above, normally contains a solid electrolyte and a polymer, and can optionally further contain one or more selected from the group consisting of an aromatic halide (partially or completely remaining even after drying), a period 5 metal, a group 1 or 2 metal, an electrode active material, and other components. Note that components contained in the solid electrolyte-containing layer are components that were contained in the slurry composition set forth above, and the content ratio of these components, with the exception of an aromatic halide and a solvent that can be vaporized through drying, is the same as the content ratio thereof in the slurry composition.

The presently disclosed solid electrolyte-containing layer can be used to produce an all-solid-state secondary battery having excellent cell characteristics such as cycle characteristics as a result of the solid electrolyte-containing layer being formed from the presently disclosed slurry composition for an all-solid-state secondary battery.

<Substrate>

No limitations are placed on the substrate onto which the slurry composition is applied. For example, a coating film of the slurry composition may be formed on the surface of a releasable substrate, this coating film may be dried to form a solid electrolyte-containing layer, and then the releasable substrate may be peeled from the solid electrolyte-containing layer. The solid electrolyte-containing layer that is peeled from the releasable substrate in this manner can be used as a free-standing film in formation of a battery member (for example, an electrode or a solid electrolyte layer) of an all-solid-state secondary battery.

Alternatively, a current collector or an electrode may be used as the substrate from a viewpoint of omitting a step of peeling the solid electrolyte-containing layer and thereby increasing production efficiency of a battery member. For example, when an electrode mixed material layer is to be produced, it is preferable that the slurry composition is applied onto a current collector that serves as a substrate.

<<Releasable Substrate>>

The releasable substrate is not specifically limited and may be a known releasable substrate such as an imide film.

<<Current Collector>>

The current collector is a material having electrical conductivity and electrochemical durability. Specifically, the current collector may, for example, be made of iron, copper, aluminum, nickel, stainless steel, titanium, tantalum, gold, platinum, or the like. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

<<Electrode>>

The electrode (positive electrode or negative electrode) is not specifically limited and may be an electrode that is obtained by forming an electrode mixed material layer containing an electrode active material, a solid electrolyte, and a binder on a current collector such as described above.

The electrode active material, solid electrolyte, and binder that are contained in the electrode mixed material layer of the electrode are not specifically limited, and known examples thereof can be used. Note that the electrode mixed material layer of the electrode may be a layer that corresponds to the presently disclosed solid electrolyte-containing layer.

<Formation Method of Solid Electrolyte-Containing Layer>

Specific examples of methods by which the solid electrolyte-containing layer may be formed include:

(1) a method in which the presently disclosed slurry composition is applied onto the surface of a current collector or electrode (surface at the electrode mixed material layer-side in the case of an electrode; same applies below) and is then dried;

(2) a method in which a current collector or an electrode is immersed in the presently disclosed slurry composition and is then dried; and (3) a method in which the presently disclosed slurry composition is applied onto a releasable substrate and is dried to produce a solid electrolyte-containing layer that is then transferred onto the surface of an electrode.

Of these methods, methods (1) and (3) in which application and drying are performed are particularly preferable due to the ease of controlling the thickness of the solid electrolyte-containing layer.

<<Application>>

Examples of methods by which the slurry composition may be applied onto the substrate include, but are not specifically limited to, doctor blading, reverse roll coating, direct roll coating, gravure coating, extrusion coating, and brush coating.

<<Drying>>

The slurry composition on the substrate may be dried by any commonly known method without any specific limitations. Examples of drying methods that may be used include drying by warm, hot, or low-humidity air, drying in a vacuum, and drying by irradiation with infrared light, electron beams, or the like.

In a case in which the solid electrolyte-containing layer is an electrode mixed material layer, the solid electrolyte-containing layer may be subjected to a pressing process by roll pressing or the like after drying. This pressing process enables further densification of the obtained electrode mixed material layer.

<<Transfer>>

The method by which the solid electrolyte-containing layer is transferred onto the surface of an electrode or the like in method (3) may be any commonly known transfer method without any specific limitations.

(Electrode)

An electrode that is obtained by forming an electrode mixed material layer on a current collector using the presently disclosed slurry composition for an all-solid-state secondary battery contains at least a solid electrolyte, an electrode active material, and a polymer in the electrode mixed material layer and can cause an all-solid-state secondary battery to display excellent cell characteristics (cycle characteristics, etc.).

(Solid Electrolyte Layer)

A solid electrolyte layer that is formed using the presently disclosed slurry composition for an all-solid-state secondary battery contains at least a solid electrolyte and a polymer and can cause an all-solid-state secondary battery to display excellent cell characteristics (cycle characteristics, etc.).

(All-Solid-State Secondary Battery)

The presently disclosed all-solid-state secondary battery includes the presently disclosed solid electrolyte-containing layer set forth above. The presently disclosed all-solid-state secondary battery may include a positive electrode, a solid electrolyte layer, and a negative electrode, for example, wherein at least one among: a positive electrode mixed material layer of the positive electrode; a negative electrode mixed material layer of the negative electrode; and the solid electrolyte layer is the presently disclosed solid electrolyte-containing layer. In other words, the presently disclosed all-solid-state secondary battery includes at least one among: a positive electrode including a positive electrode mixed material layer formed using a slurry composition for a positive electrode mixed material layer serving as the presently disclosed slurry composition for an all-solid-state secondary battery; a negative electrode including a negative electrode mixed material layer formed using a slurry composition for a negative electrode mixed material layer serving as the presently disclosed slurry composition for an all-solid-state secondary battery; and a solid electrolyte layer formed using a slurry composition for a solid electrolyte layer serving as the presently disclosed slurry composition for an all-solid-state secondary battery.

The presently disclosed all-solid-state secondary battery has excellent cell characteristics such as cycle characteristics as a result of including the presently disclosed solid electrolyte-containing layer.

Note that from a viewpoint of further improving cell characteristics such as cycle characteristics, it is preferable that the positive electrode mixed material layer of the positive electrode, the negative electrode mixed material layer of the negative electrode, and the solid electrolyte layer are each the presently disclosed solid electrolyte-containing layer in the presently disclosed all-solid-state secondary battery.

Note that any electrode for an all-solid-state secondary battery can be used in the presently disclosed all-solid-state secondary battery as an electrode for an all-solid-state secondary battery including an electrode mixed material layer that does not correspond to the presently disclosed solid electrolyte-containing layer without any specific limitations so long as it includes an electrode mixed material layer that does not correspond to the presently disclosed solid electrolyte-containing layer.

Moreover, any solid electrolyte layer, such as a solid electrolyte layer described in JP2012-243476A, JP2013-143299A, JP2016-143614A, or the like, for example, can be used in the presently disclosed all-solid-state secondary battery as a solid electrolyte layer that does not correspond to the presently disclosed solid electrolyte-containing layer without any specific limitations.

The presently disclosed all-solid-state secondary battery can be obtained by stacking the positive electrode and the negative electrode such that the positive electrode mixed material layer of the positive electrode and the negative electrode mixed material layer of the negative electrode are in opposition via the solid electrolyte layer and optionally performing pressing thereof to obtain a laminate, subsequently placing the laminate in a battery container in that form or after rolling, folding, or the like in accordance with the battery shape, and then sealing the battery container. Note that an expanded metal, an overcurrent preventing device such as a fuse or a PTC device, a lead plate, or the like may be placed in the battery container as necessary in order to prevent pressure increase inside the battery and occurrence of overcharging or overdischarging. The shape of the battery may be a coin type, button type, sheet type, cylinder type, prismatic type, flat type, or the like.

Examples

The following provides a more specific description of the present disclosure based on examples. However, the present disclosure is not limited to the following examples. In the following description, "%", "parts", and "ppm" used in expressing quantities are by mass, unless otherwise specified.

In the examples and comparative examples, the following methods were used to measure or evaluate the molecular weight (weight-average molecular weight and molecular weight distribution) and iodine value of a polymer, the metal content of a binder composition, the number-average particle diameter of a solid electrolyte, the dispersibility of a slurry composition, the adhesiveness of a solid electrolyte-containing layer, and the output characteristics, cycle characteristics, and IV resistance of an all-solid-state secondary battery.

<Molecular Weight of Polymer>

The weight-average molecular weight (Mw) and number-average molecular weight (Mn) of a polymer were measured by gel permeation chromatography (GPC) under the following measurement conditions using a LiBr-DMF solution of 10 mM in concentration. The molecular weight distribution (Mw/Mn) of the polymer was also calculated.

Separation column: Shodex KD-806M (produced by Showa Denko K.K.)
 Detector: Differential refractive index detector RID-10A (produced by Shimadzu Corporation)
 Eluent flow rate: 0.3 mL/min
 Column temperature: 40° C.
 Standard polymer: TSK standard polystyrene (produced by Tosoh Corporation)

<Iodine Value of Polymer>

An obtained polymer was vacuum dried at a temperature of 60° C. for 24 hours, and then the iodine value thereof was measured in accordance with JIS K6235(2006).

<Metal Content of Binder Composition>

A 550° C. electric furnace was used to incinerate approximately 1 g of a binder composition through approximately 3 hours of heating. Thereafter, approximately 5 mL of concentrated sulfuric acid was added to the incinerated binder composition to cause dissolution thereof, and then approximately 5 mL of concentrated nitric acid was gradually added to cause wet decomposition. After decomposition, the acid was concentrated and was made up to a volume of 10 mL with ultrapure water. An ICP-AES apparatus (produced by SII NanoTechnology Inc.; model no. SPS-5100) was then used to measure the content of each metal (relative to the amount of polymer) in the binder composition.

<Number-Average Particle Diameter of Solid Electrolyte>

The number-average particle diameter of a solid electrolyte was measured in accordance with JIS Z8825-1:2001 using a laser analyzer (laser diffraction particle size distribution analyzer "SALD-3100" produced by Shimadzu Corporation).

<Dispersibility of Slurry Composition>

The viscosity of a slurry composition for an all-solid-state secondary battery (slurry composition for an electrode mixed material layer or slurry composition for a solid electrolyte layer) was measured by a Brookfield B-type viscometer at 60 rpm (25° C.) and was evaluated by the following standard. A lower viscosity at the same solid content concentration with the same type of slurry composition indicates better dispersion of solid content such as a solid electrolyte contained in the slurry composition.

A: Viscosity of less than 3,000 mPa·s
 B: Viscosity of not less than 3,000 mPa·s and less than 5,000 mPa·s
 C: Viscosity of not less than 5,000 mPa·s and less than 8,000 mPa·s
 D: Viscosity of not less than 8,000 mPa·s or not dispersed (no fluidity)

<Adhesiveness of Solid Electrolyte-Containing Layer>

<<Positive Electrode Mixed Material Layer>>

A positive electrode was cut out as a rectangle of 1.0 cm in width by 10 cm in length to obtain a test specimen. Cellophane tape (tape prescribed by JIS Z1522) was affixed to a surface at the positive electrode mixed material layer-side of the test specimen. Thereafter, the cellophane tape was peeled from one end of the test specimen in a direction at 1800 at a speed of 50 mm/min, and the stress during this peeling was measured. Three measurements were made in this manner. An average value of the measurements was determined, was taken to be the peel strength (N/m), and was evaluated by the following standard. A larger peel strength indicates that the positive electrode mixed material layer has better adhesiveness and stronger close adherence to the current collector.

A: Peel strength of 3 N/m or more
 B: Peel strength of not less than 2 N/m and less than 3 N/m
 C: Peel strength of not less than 1 N/m and less than 2 N/m
 D: Peel strength of less than 1 N/m <<Negative Electrode Mixed Material Layer>>

A negative electrode was cut out as a rectangle of 1.0 cm in width by 10 cm in length to obtain a test specimen. Cellophane tape (tape prescribed by JIS Z1522) was affixed to a surface at the negative electrode mixed material layer-side of the test specimen. Thereafter, the cellophane tape was peeled from one end of the test specimen in a direction at 1800 at a speed of 50 mm/min, and the stress during this peeling was measured. Three measurements were made in this manner. An average value of the measurements was determined, was taken to be the peel strength (N/m), and was evaluated by the following standard. A larger peel strength indicates that the negative electrode mixed material layer has better adhesiveness and stronger close adherence to the current collector.

A: Peel strength of 4 N/m or more
 B: Peel strength of not less than 3 N/m and less than 4 N/m
 C: Peel strength of not less than 2 N/m and less than 3 N/m
 D: Peel strength of less than 2 N/m <Output Characteristics of all-Solid-State Secondary Battery>

Three all-solid-state secondary battery cells were charged to 4.2 V by a 0.1C constant-current method and subsequently discharged to 3.0 V at 0.1C in order to determine the 0.1C discharge capacity. Next, the cells were charged to 4.2 V at 0.1C and subsequently discharged to 3.0 V at 2C in order to determine the 2C discharge capacity. An average value of the 0.1C discharge capacity for the three cells was taken to be a discharge capacity (a), an average value of the 2C discharge capacity for the three cells was taken to be a discharge capacity (b), and a ratio (capacity ratio) of the discharge capacity (b) relative to the discharge capacity (a) was calculated (=discharge capacity (b)/discharge capacity (a)×100(%)) and was evaluated by the following standard. A larger value for the capacity ratio indicates that the all-solid-state secondary battery has better output characteristics.

A: Capacity ratio of 80% or more
 B: Capacity ratio of not less than 70% and less than 80%
 C: Capacity ratio of not less than 50% and less than 70%
 D: Capacity ratio of less than 50%

<Cycle Characteristics of all-Solid-State Secondary Battery>

An all-solid-state secondary battery was subjected to 50 cycles of charging and discharging at 25° C. in which the all-solid-state secondary battery was charged from 3 V to 4.2 V at 0.2C and then discharged from 4.2 V to 3 V at 0.2C. A ratio of the 0.2C discharge capacity of the 50th cycle relative to the 0.2C discharge capacity of the 1st cycle was calculated as a percentage, and this value was taken to be the capacity maintenance rate and was evaluated by the following standard. A larger value for the capacity maintenance rate indicates that there is less loss of discharge capacity and that the all-solid-state secondary battery has better cycle characteristics.

A: Capacity maintenance rate of 90% or more

B: Capacity maintenance rate of not less than 80% and less than 90%

C: Capacity maintenance rate of not less than 70% and less than 80%

D: Capacity maintenance rate of less than 70%

<IV Resistance of all-Solid-State Secondary Battery>

An all-solid-state battery was charged to an SOC (state of charge) of 50% at 1C (C is a number expressed by rated capacity (mA)/1 hr). The all-solid-state battery was then subjected to 30 seconds of charging and 30 seconds of discharging at each of 0.1C, 0.2C, 0.5C, 1C, and 2C centered around an SOC of 50%. The battery voltage after 10 seconds at the discharge side was plotted against the current value, and the gradient of this plot was determined as the IV resistance (Q) (IV resistance during charging and IV resistance during discharging). The obtained value (Q) of IV resistance was evaluated by the following standard. A smaller value for IV resistance indicates less internal resistance.

A: IV resistance of less than 80 Ω

B: IV resistance of not less than 80Ω and less than 90 Ω

C: IV resistance of not less than 90Ω and less than 100 Ω

D: IV resistance of 100Ω or more

Example 1

<Production of Binder Composition>

A reactor was charged with 180 parts of deionized water, 25 parts of sodium dodecylbenzenesulfonate aqueous solution (concentration: 10%) as an emulsifier, 25 parts of acrylonitrile as a nitrile group-containing monomer, 30 parts of n-butyl acrylate as a (meth)acrylic acid ester monomer, and 0.3 parts of t-dodecyl mercaptan as a molecular weight modifier in this order. Next, gas inside the reactor was purged three times with nitrogen, and then 45 parts of 1,3-butadiene as a diene monomer was added into the reactor. The reactor was held at a temperature 10° C. while adding 0.1 parts of cumene hydroperoxide and 0.1 parts of ferrous sulfate as polymerization initiators so as to initiate a polymerization reaction that was then caused to proceed under stirring. At the point at which the polymerization conversion rate reached 90%, 0.2 parts of hydroxylamine sulfate was added per 100 parts of monomer to stop the polymerization. Next, residual monomer was removed under reduced pressure at a water temperature of 80° C. to yield a water dispersion of a polymer precursor (nitrile rubber). An aqueous solution of calcium chloride (coagulant) was added in an amount such as to be 12 parts relative to 100 parts of polymer precursor solid content in the obtained particulate water dispersion, and stirring was performed to cause latex coagulation. Thereafter, separation by filtration was performed while also performing washing with water, and the resultant coagulated material was then vacuum dried at a temperature of 60° C. for 12 hours to yield the polymer precursor (nitrile rubber).

The polymer precursor was then hydrogenated by adopting an oil-layer hydrogenation method as the hydrogenation method. The polymer precursor was dissolved in acetone to obtain an acetone solution in which the concentration of the polymer precursor was 12%. This acetone solution was loaded into an autoclave, 200 mass ppm of a palladium/silica catalyst was added relative to the amount of the polymer precursor, and then a hydrogenation reaction was performed at a hydrogen pressure of 3.0 MPa for 6 hours. The palladium/silica catalyst was separated from the resultant reaction product by filtration, and acetone serving as a solvent was removed under reduced pressure to yield hydrogenated nitrile rubber as a target polymer. The molecular weight and iodine value of this hydrogenated nitrile rubber were measured. The results are shown in Table 1.

Next, an appropriate amount of butyl butyrate was added to the obtained hydrogenated nitrile rubber to cause dissolution, and then 1,2-dichlorobenzene as an aromatic halide was added to the resultant polymer solution such that the amount of 1,2-dichlorobenzene was 50 ppm relative to the amount of the hydrogenated nitrile rubber, thereby obtaining a binder composition (solid content concentration: 8%). The metal content of the obtained binder composition was measured. The results are shown in Table 1.

<Production of Slurry Composition for Positive Electrode Mixed Material Layer>

A conductive material dispersion liquid having a solid content concentration of 6.0% was produced by adding together 5.0 parts of carbon nanotubes (specific surface area: 230 m$^2$/g) as a conductive material, 1.0 parts (in terms of solid content) of the binder composition described above, and butyl butyrate such that the total was 100 parts, performing stirring (3,000 rpm, 10 minutes) using a disper blade, and then performing 1 hour of dispersing at a circumferential speed of 8 m/s using a bead mill in which zirconia beads of 1 mm in diameter were used.

After mixing 70 parts of lithium cobalt oxide (number-average particle diameter: 11.5 μm) as a positive electrode active material, 26.0 parts of sulfide glass formed of Li$_2$S and P$_2$S$_5$(Li$_2$S/P$_2$S$_5$=70 mol %/30 mol %; number-average particle diameter: 0.8 μm) as a solid electrolyte, 2.4 parts (in terms of solid content) of the conductive material dispersion liquid described above, and 1.6 parts (in terms of solid content) of the binder composition described above and further adding butyl butyrate to adjust the solid content concentration to 80%, these materials were mixed for 60 minutes in a planetary mixer. Thereafter, butyl butyrate was further added to adjust the solid content concentration to 65%, and then 10 minutes of mixing was performed to produce a slurry composition for a positive electrode mixed material layer. The dispersibility of this slurry composition for a positive electrode mixed material layer was evaluated. The result is shown in Table 1.

<Production of Slurry Composition for Negative Electrode Mixed Material Layer>

A conductive material dispersion liquid having a solid content concentration of 6.0% was produced by adding together 5.0 parts of carbon nanotubes (specific surface area: 230 m$^2$/g) as a conductive material, 1.0 parts (in terms of solid content) of the binder composition described above, and butyl butyrate such that the total was 100 parts, performing stirring (3,000 rpm, 10 minutes) using a disper blade, and then performing 1 hour of dispersing at a circumferential speed of 8 m/s using a bead mill in which zirconia beads of 1 mm in diameter were used.

After mixing 60 parts of graphite (number-average particle diameter: 20 μm) as a negative electrode active material, 36.5 parts of sulfide glass formed of Li$_2$S and P$_2$S$_5$ (Li$_2$S/P$_2$S$_5$=70 mol %/30 mol %; number-average particle diameter: 0.8 μm) as a solid electrolyte, 1.8 parts (in terms of solid content) of the conductive material dispersion liquid described above, and 2.2 parts (in terms of solid content) of the binder composition described above and further adding butyl butyrate to adjust the solid content concentration to 65%, these materials were mixed for 60 minutes in a planetary mixer. Thereafter, butyl butyrate was further added to adjust the solid content concentration to 60%, and then further mixing was performed in the planetary mixer to produce a slurry composition for a negative electrode mixed material layer. The dispersibility of this slurry composition for a negative electrode mixed material layer was evaluated. The result is shown in Table 1.

<Production of Slurry Composition for Solid Electrolyte Layer>

After mixing 100 parts of sulfide glass formed of $Li_2S$ and $P_2S_5$ ($Li_2S/P_2S_5$=70 mol %/30 mol %; number-average particle diameter: 0.8 μm) as a solid electrolyte and 2 parts (in terms of solid content) of the binder composition described above and further adding butyl butyrate to adjust the solid content concentration to 65 mass % inside a glove box (moisture concentration: 0.6 ppm; oxygen concentration: 1.8 ppm) under an argon gas atmosphere, these materials were mixed for 60 minutes in a planetary mixer. Thereafter, further butyl butyrate was added to adjust the solid content concentration to 55%, and then further mixing was performed in the planetary mixer to produce a slurry composition for a solid electrolyte layer. The dispersibility of this slurry composition for a solid electrolyte layer was evaluated. The result is shown in Table 1.

<Production of Positive Electrode>

The slurry composition for a positive electrode mixed material layer described above was applied onto the surface of a current collector (aluminum foil; thickness: 20 μm) and was dried (60 minutes at temperature of 120° C.) to form a positive electrode mixed material layer of 50 μm in thickness and obtain a positive electrode. This positive electrode was used to evaluate the adhesiveness of the positive electrode mixed material layer. The result is shown in Table 1.

<Production of Negative Electrode>

The slurry composition for a negative electrode mixed material layer described above was applied onto the surface of a current collector (copper foil; thickness: 15 μm) and was dried (60 minutes at temperature of 120° C.) to form a negative electrode mixed material layer of 60 μm in thickness and obtain a negative electrode. This negative electrode was used to evaluate the adhesiveness of the negative electrode mixed material layer. The result is shown in Table 1.

<Production of all-Solid-State Secondary Battery>

Next, the slurry composition for a solid electrolyte layer described above was applied onto imide film (thickness: 25 μm) and was dried (60 minutes at temperature of 120° C.) to form a solid electrolyte layer (solid electrolyte-containing layer) of 150 μm in thickness. The solid electrolyte layer on the imide film and the positive electrode were affixed such that the solid electrolyte layer and the positive electrode mixed material layer were in contact and were then subjected to a pressing process such that 400 MPa of pressure (pressing pressure) was applied in order to transfer the solid electrolyte layer onto the positive electrode mixed material layer from the imide film and thereby obtain a solid electrolyte layer-equipped positive electrode.

This solid electrolyte layer-equipped positive electrode and the negative electrode were affixed such that the solid electrolyte layer of the solid electrolyte layer-equipped positive electrode and the negative electrode mixed material layer of the negative electrode were in contact and were then subjected to a pressing process such that 400 MPa of pressure (pressing pressure) was applied to the solid electrolyte layer of the solid electrolyte layer-equipped positive electrode in order to obtain an all-solid-state secondary battery. The thickness of the solid electrolyte layer in the all-solid-state secondary battery after pressing was 120 μm. Output characteristics, cycle characteristics, and IV resistance were evaluated for this all-solid-state secondary battery. The results are shown in Table 1.

Examples 2 and 3

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that 1,2-dichlorobenzene as an aromatic halide was added such as to be 2,000 ppm (Example 2) or 7 ppm (Example 3) relative to the amount of the hydrogenated nitrile rubber in production of the binder composition. The results are shown in Table 1.

Examples 4 and 5

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that 2-ethylhexyl acrylate (Example 4) or cyclohexyl acrylate (Example 5) was used instead of n-butyl acrylate as a (meth)acrylic acid ester monomer in production of the binder composition. The results are shown in Table 1.

Examples 6 to 9

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that the amounts of acrylonitrile (AN), n-butyl acrylate (BA), and 1,3-butadiene (BD) were changed as indicated below in production of the binder composition. The results are shown in Table 1.

Example 6: AN 29 parts, BA 25 parts, BD 46 parts
Example 7: AN 10 parts, BA 35 parts, BD 55 parts
Example 8: AN 25 parts, BA 38 parts, BD 37 parts
Example 9: AN 25 parts, BA 18 parts, BD 57 parts

Example 10

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that carbon black (DENKA BLACK® (DENKA BLACK is a registered trademark in Japan, other countries, or both)) was used instead of carbon nanotubes in production of the slurry composition for a positive electrode mixed material layer and the slurry composition for a negative electrode mixed material layer. The results are shown in Table 2.

Example 11

A slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that a binder composition produced as described below was used. The results are shown in Table 2.
<Production of Binder Composition>
A polymer precursor (nitrile rubber) was obtained in the same way as in Example 1. Metathesis of this polymer precursor was performed as described below.

The polymer precursor was dissolved in 141 parts of monochlorobenzene and was loaded into a reactor. The reactor was heated to 80° C. and then 2 L of a monochlorobenzene solution containing bis(tricyclohexylphosphine) benzylidene ruthenium dichloride as a Grubbs' catalyst was added thereto such that the amount of the Grubbs' catalyst was 0.25 parts relative to 100 parts of the polymer precursor. The internal pressure of the reactor was raised to 3.5 MPa with ethylene as a co-olefin, and a metathesis reaction of the polymer was carried out at a stirring rate of 600 rpm. During the reaction, a constant temperature was maintained using a cooling coil connected to a temperature controller and a heat sensor.

Next, hydrogenation was performed as described below.

After the metathesis reaction described above, the inside of the reactor was degassed three times with 0.7 MPa $H_2$ while continuing stirring. The temperature of the reactor was then raised to 130° C., and 1 L of a monochlorobenzene solution containing Wilkinson's catalyst and triphenylphosphine was added to the reactor. The amount of Wilkinson's catalyst was 0.075 parts relative to 100 parts of the polymer, and the amount of triphenylphosphine was 1 part relative to 100 parts of the polymer. The temperature was then raised to 138° C., hydrogenation of the polymer was performed with a hydrogen pressure (gauge pressure) of 8.4 MPa, and the reaction was ended with an iodine value of 1.3 mg/100 mg as the end point. After the reaction had ended, 0.2 parts of activated carbon having an average diameter of 15 μm was added into the reactor and was stirred for 30 minutes. Thereafter, filtration was carried out using a filter having a pore diameter of 5 μm. Steam was introduced into the filtrate, and monochlorobenzene was collected and removed through steam distillation. Precipitated polymer (hydrogenated nitrile rubber) was collected by separation and drying.

Next, an appropriate amount of butyl butyrate was added to dissolve the obtained hydrogenated nitrile rubber, and 1,2-dichlorobenzene as an aromatic halide was added to the resultant polymer solution such that the amount of 1,2-dichlorobenzene was 50 ppm relative to the amount of the hydrogenated nitrile rubber, thereby obtaining a binder composition (solid content concentration: 8%).

Example 12

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that the amount of the palladium/silica catalyst was changed to 450 mass ppm relative to the amount of the polymer precursor in production of the binder composition. The results are shown in Table 2.

Example 13

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that sodium hydroxide aqueous solution was added to the water dispersion of the polymer precursor (nitrile rubber) before coagulation and the amount of calcium chloride used as a coagulant was increased in production of the binder composition. The results are shown in Table 2.

Example 14

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that the hydrogen pressure and the reaction time in the hydrogenation were changed such that the obtained polymer had an iodine value of 1.5 mg/100 mg in production of the binder composition. The results are shown in Table 2.

Examples 15 and 16

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that ethyl acrylate (Example 15) or methyl methacrylate (Example 16) was used instead of n-butyl acrylate as a (meth)acrylic acid ester monomer in production of the binder composition. The results are shown in Table 2.

Examples 17 to 19 and 23

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that cyclopentyl methyl ether (Example 17), xylene (Example 18), diisobutyl ketone (Example 19), or isobutyl isobutyrate (Example 23) was used instead of butyl butyrate in production of the binder composition, the slurry composition for a positive electrode mixed material layer, the slurry composition for a negative electrode mixed material layer, and the slurry composition for a solid electrolyte layer. The results are shown in Table 2 or 3.

Example 20

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that the amount of t-dodecyl mercaptan was changed to 6 parts in production of the binder composition. The results are shown in Table 3.

Example 21

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations other than the dispersibility of the slurry composition for a negative electrode mixed material layer and the slurry composition for a solid electrolyte layer and the adhesiveness of the negative electrode mixed material layer were performed in the same way as in Example 1 with the exception that a binder composition containing polyvinylidene fluoride was used instead of the binder composition containing the hydrogenated nitrile rubber in production of the slurry composition for a negative electrode mixed material layer and the slurry composition for a solid electrolyte layer. The results are shown in Table 3.

Example 22

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that 1,2,4-trichlorobenzene was used instead of 1,2-dichlorobenzene as an aromatic halide in production of the binder composition. The results are shown in Table 3.

Example 24

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that carbon nanotubes having a specific surface area of 150 m²/g were used instead of carbon nanotubes having a specific surface area of 230 m²/g as a conductive material in production of the slurry composition for a positive electrode mixed material layer and the slurry composition for a negative electrode mixed material layer. The results are shown in Table 3.

Comparative Examples 1 and 2

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that the amounts of acrylonitrile (AN), n-butyl acrylate (BA), and 1,3-butadiene (BD) were changed as indicated below in production of the binder composition. The results are shown in Table 4.

Comparative Example 1: AN 25 parts, BA 0 parts, BD 75 parts

Comparative Example 2: AN 0 parts, BA 30 parts, BD 70 parts

Comparative Example 3

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that 1,2-dichlorobenzene was not used as an aromatic halide in production of the binder composition. The results are shown in Table 4.

Comparative Example 4

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that 1,2-dichlorobenzene as an aromatic halide was added such as to be 5,000 ppm relative to the amount of the hydrogenated nitrile rubber in production of the binder composition. The results are shown in Table 4.

Comparative Example 5

A binder composition, a slurry composition for a positive electrode mixed material layer, a slurry composition for a negative electrode mixed material layer, a slurry composition for a solid electrolyte layer, a positive electrode, a negative electrode, and an all-solid-state secondary battery were prepared and various evaluations were performed in the same way as in Example 1 with the exception that monochlorobenzene was used instead of 1,2-dichlorobenzene as an aromatic halide and the monochlorobenzene was added such as to be 200 ppm relative to the amount of the hydrogenated nitrile rubber in production of the binder composition. The results are shown in Table 4.

Note that in Tables 1 to 4, shown below:
"Nitrile group" indicates nitrile group-containing monomer unit;
"(Meth)acrylic acid ester" indicates (meth)acrylic acid ester monomer unit;
"Diene" indicates diene monomer unit;
"AN" indicates acrylonitrile unit;
"BA" indicates n-butyl acrylate unit;
"EHA" indicates 2-ethylhexyl acrylate unit;
"CHA" indicates cyclohexyl acrylate unit;
"EA" indicates ethyl acrylate unit;
"MMA" indicates methyl methacrylate unit;
"H-BD" indicates hydrogenated 1,3-butadiene unit;

"Mw/Mn" indicates molecular weight distribution;
"Mw" indicates weight-average molecular weight;
"DCB" indicates 1,2-dichlorobenzene;
"TCB" indicates 1,2,4-trichlorobenzene;
"CB" indicates monochlorobenzene;
"Pd" indicates palladium;
"Rh" indicates rhodium;
"Ru" indicates ruthenium;
"Na" indicates sodium;
"Ca" indicates calcium;
"DIK" indicates diisobutyl ketone;
"XY" indicates xylene;

32

"HB" indicates butyl butyrate;
"IBIB" indicates isobutyl isobutyrate;
"CPME" indicates cyclopentyl methyl ether;
"CNT230" indicates carbon nanotubes having specific surface area of 230 m$^2$/g;
"CNT150" indicates carbon nanotubes having specific surface area of 150 m$^2$/g;
"DB" indicates DENKA BLACK;
"Positive" indicates positive electrode;
"Negative" indicates negative electrode; and
"Solid" indicates solid electrolyte layer.

TABLE 1

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| Binder composition | Polymer | Nitrile group | Type | AN | AN | AN | AN | AN | AN | AN | AN | AN |
| | | | Proportion [mass %] | 25 | 25 | 25 | 25 | 25 | 29 | 10 | 25 | 25 |
| | | (Meth)acrylic acid ester | Type | BA | BA | BA | EHA | CHA | BA | BA | BA | BA |
| | | | Proportion [mass %] | 30 | 30 | 30 | 30 | 30 | 25 | 35 | 38 | 18 |
| | | Diene | Type | H-BD | H-BD | H-BD | H-BD | H-BD | H-BD | H-BD | H-BD | H-BD |
| | | | Proportion [mass %] | 45 | 45 | 45 | 45 | 45 | 46 | 55 | 37 | 57 |
| | | | Mw/Mn [-] | 3.5 | 3.5 | 3.5 | 3.5 | 3.5 | 4 | 3.2 | 3.8 | 3.3 |
| | | | Mw [-] | 400000 | 400000 | 400000 | 350000 | 450000 | 420000 | 380000 | 300000 | 500000 |
| | | | Iodine value [mg/100 mg] | 5 | 5 | 5 | 5 | 5 | 5 | 5 | 5 | 5 |
| | | Aromatic halide | Type | DCB | DCB | DCB | DCB | DCB | DCB | DCB | DCB | DCB |
| | | | Amount [mass ppm] | 50 | 2,000 | 7 | 50 | 50 | 50 | 50 | 50 | 50 |
| | | Period 5 metal | Type | Pd | Pd | Pd | Pd | Pd | Pd | Pd | Pd | Pd |
| | | | Amount [mass ppm] | 80 | 80 | 80 | 80 | 80 | 80 | 80 | 80 | 80 |
| | | | Type | — | — | — | — | — | — | — | — | — |
| | | | Amount [mass ppm] | — | — | — | — | — | — | — | — | — |
| | | Group 1 or 2 metal | Type | Na | Na | Na | Na | Na | Na | Na | Na | Na |
| | | | Amount [mass ppm] | 10 | 10 | 10 | 10 | 10 | 10 | 10 | 10 | 10 |
| | | | Type | Ca | Ca | Ca | Ca | Ca | Ca | Ca | Ca | Ca |
| | | | Amount [mass ppm] | 100 | 100 | 100 | 100 | 100 | 100 | 100 | 100 | 100 |
| | | Solvent | Type | HB | HB | HB | HB | HB | HB | HB | HB | HB |
| | Conductive material | | Type | CNT230 | CNT230 | CNT230 | CNT230 | CNT230 | CNT230 | CNT230 | CNT230 | CNT230 |
| | Dispersibility | | Positive | A | B | B | A | A | B | B | A | A |
| | | | Negative | A | B | B | A | A | B | B | A | A |
| | | | Solid | A | B | B | A | A | B | B | A | A |
| | Adhesiveness | | Positive | A | A | A | A | A | A | A | A | B |
| | | | Negative | A | A | A | A | A | A | A | A | B |
| | IV resistance | | | A | B | B | A | A | B | B | A | B |
| | Output characteristics | | | A | B | B | A | A | B | B | A | B |
| | Cycle characteristics | | | A | B | B | A | A | B | B | B | B |

TABLE 2

| | | | | Example 10 | Example 11 | Example 12 | Example 13 | Example 14 | Example 15 | Example 16 | Example 17 | Example 18 |
|---|---|---|---|---|---|---|---|---|---|---|---|---|
| Binder composition | Polymer | Nitrile group | Type | AN | AN | AN | AN | AN | AN | AN | AN | AN |
| | | | Proportion [mass %] | 25 | 25 | 25 | 25 | 25 | 25 | 25 | 25 | 25 |
| | | (Meth)acrylic acid ester | Type | BA | BA | BA | BA | BA | EA | MMA | BA | BA |
| | | | Proportion [mass %] | 30 | 30 | 30 | 30 | 30 | 30 | 30 | 30 | 30 |
| | | Diene | Type | H-BD | H-BD | H-BD | H-BD | H-BD | H-BD | H-BD | H-BD | H-BD |
| | | | Proportion [mass %] | 45 | 45 | 45 | 45 | 45 | 45 | 45 | 45 | 45 |
| | | | Mw/Mn [-] | 3.5 | 3.5 | 3.5 | 3.5 | 3.5 | 2.5 | 3.5 | 3.5 | 3.5 |
| | | | Mw [-] | 400000 | 400000 | 400000 | 400000 | 400000 | 350000 | 350000 | 400000 | 400000 |
| | | | Iodine value [mg/100 mg] | 5 | 1.3 | 5 | 5 | 1.5 | 5 | 5 | 5 | 5 |
| | | Aromatic halide | Type | DCB | DCB | DCB | DCB | DCB | DCB | DCB | DCB | DCB |
| | | | Amount [mass ppm] | 50 | 50 | 50 | 50 | 50 | 50 | 50 | 50 | 50 |
| | | Period 5 metal | Type | Pd | Rh | Pd | Pd | Pd | Pd | Pd | Pd | Pd |
| | | | Amount [mass ppm] | 80 | 5 | 200 | 80 | 150 | 80 | 80 | 80 | 80 |
| | | | Type | — | Ru | — | — | — | — | — | — | — |
| | | | Amount [mass ppm] | — | 3 | — | — | — | — | — | — | — |
| | | Group 1 or 2 metal | Type | Na | Na | Na | Na | Na | Na | Na | Na | Na |
| | | | Amount [mass ppm] | 10 | 20 | 10 | 300 | 10 | 10 | 10 | 10 | 10 |
| | | | Type | Ca | Ca | Ca | Ca | Ca | Ca | Ca | Ca | Ca |
| | | | Amount [mass ppm] | 100 | 350 | 100 | 1,800 | 100 | 100 | 100 | 100 | 100 |
| | | Solvent | Type | HB | HB | HB | HB | HB | HB | HB | CPME | XY |
| | Conductive material | | Type | DB | CNT230 | CNT230 | CNT230 | CNT230 | CNT230 | CNT230 | CNT230 | CNT230 |
| | Dispersibility | | Positive | A | A | A | B | A | A | A | A | A |
| | | | Negative | A | A | A | B | A | A | A | A | A |
| | | | Solid | A | A | A | B | A | A | A | A | A |

TABLE 2-continued

| | | | Example 10 | Example 11 | Example 12 | Example 13 | Example 14 | Example 15 | Example 16 | Example 17 | Example 18 |
|---|---|---|---|---|---|---|---|---|---|---|---|
| Adhesiveness | | Positive | A | A | A | A | B | B | B | A | A |
| | | Negative | A | A | A | A | B | B | B | A | A |
| IV resistance | | | B | A | A | B | A | A | A | A | A |
| Output characteristics | | | B | A | A | B | A | A | A | A | A |
| Cycle characteristics | | | B | A | B | B | B | B | B | A | A |

TABLE 3

| | | | | | Example 19 | Example 20 | Example 21 | Example 22 | Example 23 | Example 24 |
|---|---|---|---|---|---|---|---|---|---|---|
| Binder composition | Polymer | Nitrile group | | Type | AN | AN | AN | AN | AN | AN |
| | | | | Proportion [mass %] | 25 | 25 | 25 | 25 | 25 | 25 |
| | | (Meth)acrylic acid ester | | Type | BA | BA | BA | BA | BA | BA |
| | | | | Proportion [mass %] | 30 | 30 | 30 | 30 | 30 | 30 |
| | | Diene | | Type | H-BD | H-BD | H-BD | H-BD | H-BD | H-BD |
| | | | | Proportion [mass %] | 45 | 45 | 45 | 45 | 45 | 45 |
| | | | Mw/Mn [-] | | 3.5 | 3 | 3.5 | 3.5 | 3.5 | 3.5 |
| | | | Mw [-] | | 400000 | 50000 | 400000 | 400000 | 400000 | 400000 |
| | | | Iodine value [mg/100 mg] | | 5 | 5 | 5 | 5 | 5 | 5 |
| | | Aromatic halide | | Type | DCB | DCB | DCB | TCB | DCB | DCB |
| | | | | Amount [mass ppm] | 50 | 50 | 50 | 50 | 50 | 50 |
| | | Period 5 metal | | Type | Pd | Pd | Pd | Pd | Pd | Pd |
| | | | | Amount [mass ppm] | 80 | 80 | 80 | 80 | 80 | 80 |
| | | | | Type | — | — | — | — | — | — |
| | | | | Amount [mass ppm] | — | — | — | — | — | — |
| | | Group 1 or 2 metal | | Type | Na | Na | Na | Na | Na | Na |
| | | | | Amount [mass ppm] | 10 | 10 | 10 | 10 | 10 | 10 |
| | | | | Type | Ca | Ca | Ca | Ca | Ca | Ca |
| | | | | Amount [mass ppm] | 100 | 100 | 100 | 100 | 100 | 100 |
| | | Solvent | | Type | DIB | HB | HB | HB | IBIB | HB |
| Conductive material | | | | Type | CNT230 | CNT230 | CNT230 | CNT230 | CNT230 | CNT150 |
| Dispersibility | | | | Positive | A | A | A | B | A | A |
| | | | | Negative | A | A | — | B | A | A |
| | | | | Solid | A | A | — | B | A | A |
| Adhesiveness | | | | Positive | A | A | A | B | A | A |
| | | | | Negative | A | A | — | B | A | A |
| IV resistance | | | | | A | A | B | B | A | B |
| Output characteristics | | | | | A | A | B | B | A | A |
| Cycle characteristics | | | | | A | B | B | B | A | A |

TABLE 4

| | | | | | Comparative Example 1 | Comparative Example 2 | Comparative Example 3 | Comparative Example 4 | Comparative Example 5 |
|---|---|---|---|---|---|---|---|---|---|
| Binder composition | Polymer | Nitrile group | | Type | AN | — | AN | AN | AN |
| | | | | Proportion [mass %] | 25 | — | 25 | 25 | 25 |
| | | (Meth)acrylic acid ester | | Type | — | BA | BA | BA | BA |
| | | | | Proportion [mass %] | — | 30 | 30 | 30 | 30 |
| | | Diene | | Type | H-BD | H-BD | H-BD | H-BD | H-BD |
| | | | | Proportion [mass %] | 75 | 70 | 45 | 45 | 45 |
| | | | Mw/Mn [-] | | 3.5 | 3.5 | 3.5 | 3.5 | 3.5 |
| | | | Mw [-] | | 450000 | 480000 | 400000 | 400000 | 400000 |
| | | | Iodine value [mg/100 mg] | | 5 | 5 | 5 | 5 | 5 |
| | | Aromatic halide | | Type | DCB | DCB | — | DCB | CB |
| | | | | Amount [mass ppm] | 50 | 50 | — | 5000 | 200 |
| | | Period 5 metal | | Type | Pd | Pd | Pd | Pd | Pd |
| | | | | Amount [mass ppm] | 80 | 80 | 80 | 80 | 80 |
| | | | | Type | — | — | — | — | — |
| | | | | Amount [mass ppm] | — | — | — | — | — |
| | | Group 1 or 2 metal | | Type | Na | Na | Na | Na | Na |
| | | | | Amount [mass ppm] | 10 | 10 | 10 | 10 | 10 |
| | | | | Type | Ca | Ca | Ca | Ca | Ca |
| | | | | Amount [mass ppm] | 100 | 100 | 100 | 100 | 100 |
| | | Solvent | | Type | HB | HB | HB | HB | HB |
| Conductive material | | | | Type | CNT230 | CNT230 | CNT230 | CNT230 | CNT230 |
| Dispersibility | | | | Positive | C | D | D | D | C |
| | | | | Negative | C | D | D | D | C |
| | | | | Solid | C | D | C | D | C |
| Adhesiveness | | | | Positive | D | C | C | C | C |
| | | | | Negative | D | C | C | C | C |

TABLE 4-continued

| | Comparative Example 1 | Comparative Example 2 | Comparative Example 3 | Comparative Example 4 | Comparative Example 5 |
|---|---|---|---|---|---|
| IV resistance | C | D | D | D | C |
| Output characteristics | C | D | D | D | C |
| Cycle characteristics | D | D | D | D | C |

It can be seen from Tables 1 to 3 that through the binder compositions of Examples 1 to 24, it is possible to produce a slurry composition having excellent dispersibility and to cause an all-solid-state secondary battery to display excellent cycle characteristics. It can also be seen that through the binder compositions of Examples 1 to 24, it is possible to form a solid electrolyte-containing layer having excellent adhesiveness and to lower IV resistance of an all-solid-state secondary battery while also improving output characteristics of the all-solid-state secondary battery.

In contrast, it can be seen from Table 4 that dispersibility of a slurry composition, adhesiveness of a solid electrolyte-containing layer, and cell characteristics of an all-solid-state secondary battery deteriorate in Comparative Example 1 in which the used binder composition contains a polymer that does not include a (meth)acrylic acid ester monomer unit and in Comparative Example 2 in which the used binder composition contains a polymer that does not include a nitrile group-containing monomer unit.

It can also be seen from Table 4 that dispersibility of a slurry composition, adhesiveness of a solid electrolyte-containing layer, and cell characteristics of an all-solid-state secondary battery deteriorate in Comparative Example 3 in which the used binder composition does not contain a specific aromatic halide and in Comparative Example 4 in which the amount of a specific aromatic halide in the used binder composition exceeds a specific upper limit.

It can also be seen from Table 4 that dispersibility of a slurry composition, adhesiveness of a solid electrolyte-containing layer, and cell characteristics of an all-solid-state secondary battery deteriorate in Comparative Example 5 in which monochlorobenzene is used instead of a specific aromatic halide.

INDUSTRIAL APPLICABILITY

According to the present disclosure, it is possible to provide a binder composition for an all-solid-state secondary battery with which it is possible to produce a slurry composition for an all-solid-state secondary battery having excellent dispersibility and to form a solid electrolyte-containing layer that can cause an all-solid-state secondary battery to display excellent cycle characteristics.

Moreover, according to the present disclosure, it is possible to provide a slurry composition for an all-solid-state secondary battery that has excellent dispersibility and with which it is possible to form a solid electrolyte-containing layer that can cause an all-solid-state secondary battery to display excellent cycle characteristics.

Furthermore, according to the present disclosure, it is possible to provide a solid electrolyte-containing layer that can cause an all-solid-state secondary battery to display excellent cycle characteristics and an all-solid-state secondary battery that has excellent cycle characteristics.

The invention claimed is:

1. A slurry composition for an all-solid-state secondary battery comprising:
a solid electrolyte; and
a binder composition comprising a polymer, an aromatic halide, and a solvent, wherein
the polymer includes a nitrile group-containing monomer unit in a proportion of not less than 10 mass % and not more than 35 mass % and a (meth) acrylic acid ester monomer unit in a proportion of not less than 15 mass % and not more than 40 mass %,
the aromatic halide has a structure in which not less than 2 and not more than 4 halogen atoms are bonded directly to an aromatic ring, and
content of the aromatic halide is not less than 5 mass ppm and not more than 3,000 mass ppm relative to content of the polymer.

2. The slurry composition for an all-solid-state secondary battery according to claim 1, wherein the binder composition further comprises a metal belonging to period 5 of the periodic table and belonging to groups 3 to 14 of the periodic table in an amount of not less than 0.5 mass ppm and not more than 200 mass ppm relative to the content of the polymer.

3. The slurry composition for an all-solid-state secondary battery according to claim 1, wherein the binder composition further comprises a metal belonging to group 1 or group 2 of the periodic table in an amount of not less than 5 mass ppm and not more than 3,000 mass ppm relative to the content of the polymer.

4. The slurry composition for an all-solid-state secondary battery according to claim 1, wherein the polymer has an iodine value of not less than 0.5 mg/100 mg and not more than 20 mg/100 mg.

5. The slurry composition for an all-solid-state secondary battery according to claim 1, wherein a number of carbon atoms forming an alkyl group that is bonded to a non-carbonyl oxygen atom in the (meth) acrylic acid ester monomer unit is not less than 4 and not more than 9.

6. The slurry composition for an all-solid-state secondary battery according to claim 1, further comprising an electrode active material.

7. The slurry composition for an all-solid-state secondary battery according to claim 6, further comprising carbon nanotubes.

8. A solid electrolyte-containing layer formed using the slurry composition for an all-solid-state secondary battery according to claim 1.

9. An all-solid-state secondary battery comprising the solid electrolyte-containing layer according to claim 8.

* * * * *